(12) United States Patent
Sinclair et al.

(10) Patent No.: US 7,545,980 B2
(45) Date of Patent: *Jun. 9, 2009

(54) METHOD OF AND APPARATUS FOR CLASSIFYING AN IMAGE

(75) Inventors: David Andrew Sinclair, Cambridge (GB); Kenneth Robert Wood, Cambridge (GB)

(73) Assignee: AT&T Investments UK Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/760,124

(22) Filed: Jun. 8, 2007

(65) Prior Publication Data

US 2007/0230801 A1    Oct. 4, 2007

Related U.S. Application Data

(63) Continuation of application No. 10/129,763, filed as application No. PCT/GB00/04319 on Nov. 13, 2000, now Pat. No. 7,239,746.

(60) Provisional application No. 60/165,681, filed on Nov. 16, 1999.

(51) Int. Cl.
  *G06K 9/34* (2006.01)
  *G06K 9/60* (2006.01)

(52) U.S. Cl. ........................ 382/173; 382/305

(58) Field of Classification Search ............. 382/173, 382/305, 224–228, 155–160, 162, 167, 107, 382/199, 190; 707/1–6, 104.1, 102; 706/14, 706/20; 358/403–404
See application file for complete search history.

(56) References Cited

U.S. PATENT DOCUMENTS

| 5,805,746 | A | 9/1998 | Miyatake et al. |
| 6,173,275 | B1 | 1/2001 | Caid et al. |
| 6,253,201 | B1 | 6/2001 | Abdel-Mottaleb et al. |
| 6,345,279 | B1 | 2/2002 | Li et al. |
| 6,466,940 | B1 | 10/2002 | Mills |
| 7,239,746 | B1 * | 7/2007 | Sinclair et al. .............. 382/173 |

FOREIGN PATENT DOCUMENTS

| WO | 99/67696 | 12/1999 |
| WO | 01/37131 | 5/2001 |

* cited by examiner

*Primary Examiner*—Sherali Ishrat
(74) *Attorney, Agent, or Firm*—Renner, Otto, Boisselle & Sklar, LLP

(57) ABSTRACT

A technique is provided for classifying images in a library (1) for subsequent selective retrieval. Each library image is segmented (2) into a plurality of coherent regions. Each of the regions is analysed in respect of a plurality of visual properties, each of which is ascribed a number according to the value of the visual property. The property numbers are then compared (4) with bands of the available property range and a computer-readable character, such as a letter of the alphabet, is ascribed to each of the property values. The characters are then arranged (5) in a predetermined order to form a region character string. The strings for each region are then indexed (7) to form an index (8) of the images by region character string. For image retrieval, a target image (10) is analysed in the same way to form region character strings which are then supplied to a text retrieval system (12) for detecting matches with entries in the index (8). Library images having matching regions are retrieved from the library (1).

18 Claims, 9 Drawing Sheets

Photo of red and green grapes

Regions resulting from segmentation
of photo in figure 3

Photo of green grapes, cheese, and biscuits

Regions resulting from segmentation
of photo in figure 5

Photo of green grapes

Regions resulting from segmentation of photo in figure 7

METHOD OF AND APPARATUS FOR CLASSIFYING AN IMAGE

CROSS REFERENCE TO RELATED APPLICATION

This application is a continuation of U.S. patent application Ser. No. 10/129,763, filed on May 8, 2002 now U.S. Pat. No. 7,239,746, which is hereby incorporated herein by reference in its entirety, is a 371 of PCT/GB00/04319, filed on Nov. 13, 2000, and claims benefit of U.S. Provisional Application No. 60/165,681, filed Nov. 16, 1999.

The present invention relates to a method of and an apparatus for classifying an image. The present invention also relates to an index of images, a method of and an apparatus for image retrieval, a program and a medium containing such a program.

A known type of image retrieval system is based on generating and searching global image properties such as colour histograms or texture filter banks. However, such techniques are inadequate for retrieval from large collections of diverse images. Image retrieval techniques based on localised image properties are known and are generally based on either of two image-partitioning schemes. In the first scheme, the image is split into easily defined regular sub-divisions to which global measures are applied. An example of this technique is disclosed in Squire, D. M., Muller, H., and Raki, J. "Content-based query of image databases, inspirations from text retrieval: inverted files, frequency-based weights and relevance feedback". Proceedings of SCIA99, 1999. In the second scheme, the image is segmented into regions based on edges, colour and texture using the properties of the regions to build an index of an image collection. A technique of this type is disclosed in Howe, N. R "Percentile blobs for image similarity." IEEE Workshop on Content-based Access to Image and Video Libraries, pp 78-83, 1998 and Wood, M. E. J., Campbell, N. W. and Thomas, B. T. "Interactive refinement by relevance feedback in content-based digital image retrieval" Proceedings of ACM Multimedia 98, pp 13-20, 1998. Both techniques generally use multi-dimensional indexing or graph-matching techniques for image retrieval, although Squire et al (see above) adapt a text-based information retrieval technique to the above-mentioned first image-partitioning scheme.

According to a first aspect of the invention, there is provided a method of classifying an image, comprising the steps of segmenting the image into a plurality of regions and, for at least one of the regions:

quantifying each of a plurality of visual properties of the region on a numerical scale for the property;

comparing each quantified property with a plurality of bands of the numeric scale for the property, each band being associated with a computer-readable character; and arranging in a predetermined order the characters associated with the bands in which the quantified properties fall to form a region character string.

The segmenting step may comprise segmenting the image into a plurality of coherent regions.

The visual properties may include area. The numeric scale for area may be logarithmic.

The visual properties may include at least one colour property. The numeric scale for the colour property may be linear.

The visual properties may include brightness. The numeric scale for brightness may be linear.

The visual properties may include shape.

The visual properties may include texture.

Each region character string may include two-dimensional coordinates representing the position of the corresponding region in the image.

The method may comprise supplying at least one of the quantified properties to at least one neural network which is trained to recognise at least one substance and forming, in response to recognition by the neural network, another region character string. The other region character string may be descriptive of the at least one substance. The other region character string may be a semantic word.

The method may comprise associating the region character strings with the image.

The region character string may be embedded in a markup language.

According to a second aspect of the invention, there is provided a method of classifying a plurality of images, comprising classifying each of the images by a method according to the first aspect of the invention.

The method may comprise forming an index of the images by the region character strings.

According to a third aspect of the invention, there is provided an index formed by such a method.

According to a fourth aspect of the invention, there is provided a method of image retrieval, comprising generating at least one region character string and comparing the at least one character string with the character strings formed by a method according to the second aspect of the invention.

The comparison may be performed by a text retrieval system.

The at least one region character string may be generated by a method according to the first aspect of the invention.

A match may be indicated when at least some of the characters of the at least one generated character string match with the corresponding characters of the character strings formed by a method according to the second aspect of the invention.

The method may comprise generating at least one further region character string from the at least one generated region character string by changing at least one of the characters to a character associated with a band adjacent the band in which the corresponding quantified property falls and comparing the at least one further region character string with the character strings formed by a method according to the second aspect of the invention.

According to a fifth aspect of the invention, there is provided a method of organising a plurality of images, comprising classifying the images by a method according to the second aspect of the invention and arranging the images in accordance with the region character strings associated therewith.

Images whose region character strings match most closely may be arranged adjacent each other.

According to a sixth aspect of the invention, there is provided an apparatus for performing a method according to the first, second, fourth or fifth aspect of the invention.

The apparatus may comprise a programmed computer.

According to a seventh aspect of the invention, there is provided a program for controlling a computer of such an apparatus.

According to an eighth aspect of the invention, there is provided a medium containing a program according to the sixth aspect of the invention.

According to a ninth aspect of the invention, there is provided an apparatus for classifying an image, comprising:

means for segmenting the image into a plurality of regions;

means for quantifying each of a plurality of visual properties of at least one of the regions on a numeric scale for the property;

means for comparing each quantified property with a plurality of bands of the numeric scale for the property, each band being associated with a computer readable character; and means for arranging in a predetermined order the characters associated with the bands in which the quantified properties fall to form a region character string.

It is thus possible to provide techniques for classifying images in a way such as to permit effective searching and image retrieval. By using computer-readable characters arranged in strings to classify the coherent regions of each image, text-based information retrieval systems may be used for image retrieval. Such systems provide efficient retrieval of images on the basis of image content. Another advantage of this technique is that it allows descriptions of image content to be embedded in markup languages such as XML.

The invention will be further described, by way of example, with reference to the accompanying drawings, in which.

Figure 1:
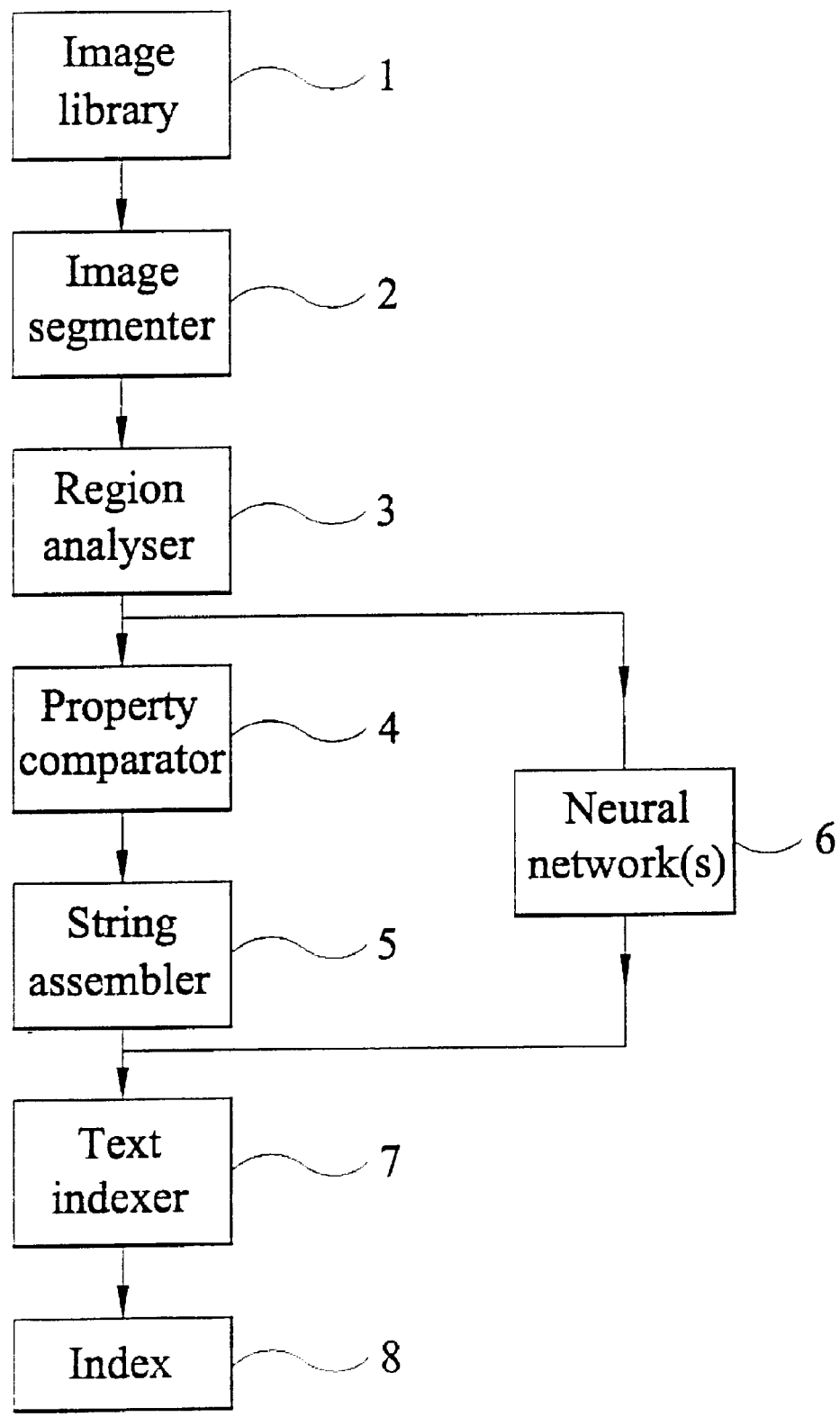
FIG. 1 is a block schematic diagram of a system for classifying images constituting a first embodiment of the invention.

FIG. 1 illustrates a system for classifying images contained in an image library 1. The image library 1 contains a plurality of images in computer-readable form, for example digitally encoded and stored in a suitable storage medium such as CD-ROM or accessible from remote storage such as via the internet. Although it is possible to classify individual images in real time, for example captured by a digital camera, it is generally preferable for images to be stored after capture and then presented to the system for classification.

The images are supplied one at a time to an image segmenter 2 which segments the image into a plurality of coherent regions. In this context, a coherent region is an area of the image of generally uniform colour and/or texture whose boundaries occur where there is a significant change in colour and/or texture. The actual technique used for image segmentation is not important but should be such as to provide good quality segmentation. For example, there are various known techniques for segmenting images and one such technique makes use of colour edge detection and Voronoi-seeded region growing, for example as disclosed in Sinclair, D. "Voronoi seeded colour image segmentation", Technical Report 1999.3, AT&T Laboratories Cambridge, http://www.uk.research.att.com/abstracts.html. and in Sinclair, D. and Wood, K. R. "Colour edge detection and Voronoi-seeded segmentation for region-based image retrieval". Submitted to the International Conference on Computer Vision (ICCV99). 8 pp, 1999 and in the references referred to in this paper, the subject matter of all of which papers is incorporated herein by reference.

The image sementer 2 supplies each region for analysis to a region analyser 3. The region analyser 3 analyses each region in turn in respect of colour distribution, texture patterns and shape. For example, the colour distribution may be analysed so as to assess the mean colour of the region and the colour covariance and a colour histogram may be formed. The shape analysis may include analysing the boundary shape, determining the absolute size of the region, determining the size of the region relative to the size of the whole image, and position of the region relative to the boundaries of the image. An example of a technique which may be used as or as part of such shape analysis involves computing, for each picture element (pixel) on the boundary of each region, the local curvature and the width of the region perpendicular to the local curvature. The set of pairs of curvature against width forms a representation of the region shape and this data may be clustered or loaded into a histogram. However, any suitable technique may be used and other examples are disclosed in:

A. Ashbrook, N. Thacker, and P. Rockett. "Pairwise geometric histograms: A scaleable solution for the recognition of 2d rigid shape." Technical Report 94/30. Sheffield University, Electronic Systems Group, 1994; I. Biederman. "Matching image edges to object memory." Int. Conf. on Computer vision, pages 384-392, 1987; D. Forsyth, J. Malik, M. Fleck, and J. Ponce. "Primitives, perceptual organisation and object recognition." Technical Report http://IITTP.CS.Berkelev.EDU/daf/vrll.ps.Z, University of California, Berkeley, Computer Science Division, 1997; B. Huet and E. Hancock. "Fuzzy relational distance for large-scale object recognition." Proc. Conf. Computer Vision and Pattern Recognition, pages 138-143, 1998; R. Rangayyan, M. El-Faramawy, J. Desautels, and O. Alim. "Measure of acutance and shape for classification of breast tumours." IEEE Transactions on Pattern Analysis and Machine Intelligence, 16:799-810, 1997; E. Rivlin, S. Dickinson, and A. Rosenfeld. "Recognition by functional parts." Proc. Conf. Computer Vision and Pattern Recognition, pages 267-274, 1994; C. A. Rothwell, A. P. Zisserman, J. L. Mundy, and D. A. Forsyth. "Efficient model library access by projectively invariant indexing functions." Proc. Conf. on Computer Vision and Pattern Recognition, 1992; H. Tek, P. Stoll, and B. Kimia. "Shocks from images: propagation of orientation elements." Proc. Conf. Computer Vision and Pattern Recognition, pages 839 845, 1997; and S. Sclaroff and A. Pentland, "Modal matching for correspondence and recognition." IEEE Trans. Pattern Analysis Mach. Intell. 17 pages 545-561 (1995), the contents of all of which are incorporated herein by reference.

Examples of texture analysis are disclosed in S. Zhu, Y. Wu and D. Mumford, "Minimax entropy principle and its application to texture modelling", Neural Computation, Vol. 9, pp 1627-1660, 1997 and T. Hofman, J. Puzicha and J. Buhman, "Unsupervised texture segmentation in a deterministic annealing framework", IEEE Transactions on Pattern Analysis and Machine Intelligence, 20 (8), pp 803-818, 1998, the contents of which are incorporated herein by reference.

For each of at least some of the region properties which are analysed by the analyser 3, the property may have any numerical value within a range of possible values. The range of values of each such property is partitioned into contiguous bands or sub-ranges and each such band is assigned a computer-representable or computer-readable character. The region analyser 3 then assigns, for each region of each image, a character for the band in which the value of each of its properties falls. A string assembler 5 receives the characters for each region of each image and assembles them in a predetermined order corresponding to a predetermined order of the properties so as to form a region character string which represents the appearance of the coherent region. For example, the computer-readable characters may be letters of the alphabet, such as lower case letters. An example of visual properties, letter ranges and scale for mapping region properties to letters is as follows:

| Property | Letter Range | Scale |
|---|---|---|
| Area | a-z | logarithmic |
| Colour (red) | a-f | linear |
| Colour (green) | a-f | linear |
| Colour (blue) | a-f | linear |
| Sharp (entropy) | a-z | linear |
| Texture (class) | a-d | enumerated |
| Texture (direction) | a-i | enumerated |

For example, a large green fuzzy region of an image, perhaps an image of a wool sweater, might be represented in this mapping by a region character string "rafambc". Each coherent region of the currently segmented image is analysed in this way and allocated a region character string or "region word". Each region word may then be embedded in a markup language, for example XML to form an XML-like region-word file containing one tag per region, of the form:

<RW id=7 x=173 y=55>rafambc</RW> where RW indicates region word, id is an identifier of the image (in this case image number 7), x and y represent the position of the centre of the region (for example relative to an origin at the bottom left corner of the image and in terms of the number of pixels horizontally and vertically from the origin), and the region character string or word is "rafambc".

The analysis performed by the region analyser 3 is also supplied to one or more neural networks indicated generally at 6. At least some of the analysed region data are used as inputs to the or each neural network, which is trained to recognise a common substance. For example, respective neural networks may be trained to recognise common substances such as sky, skin, grass, trees, water, etc. In this context, the term "substance" is not limited to a single material but encompasses any region comprising a visually distinguishable composite of one or more material types or basic substances where there may be a significant within-composite variation in visual appearance or parametric description returned by a segmentation routine.

If the neural network or one of the neural networks responds beyond a predetermined threshold, a semantic region-word, such as "sky" or "skin" corresponding to the above examples, is generated for the region currently be analysed. These region-words are descriptive of the content of the region and may be natural language words as in this example. When the neural network 6 or one of the neural networks 6 responds in this way, the resulting semantic region-word may be used in place of or in addition to the region character string provided by the assembler 5.

The string assembler 5 and the neural network or networks 6 produce a list of region character strings or words which represent the visual content of each image in the image library 1. The list of character strings is supplied to a text indexer 7 which indexes the character strings, for example using standard text-indexing techniques such as those used in word search engines, examples of which are AltaVista (http://www.altavista.com) and Google (http://www.google.com). Other suitable techniques are disclosed in S. E. Robertson and K. Sparck Jones, "Simple, proven approaches to text retrieval", Technical Report 356, Cambridge University Computing Laboratory, 1997 and H. Turtle and W. B. Croft, "Evaluation of an inference network-based retrieval model", ACM Transactions in Information Systems, Vol. 9, No. 3, pp 187-221, 1991, the contents of which are incorporated herein by reference. The text indexer 7 thus forms an index 8 for all of the images in the library 1 and the index can be searched, for example using standard text information retrieval techniques as described hereinafter, on the basis of a target image analysed using the same techniques or on the basis of character strings entered in any desired way. These possibilities are illustrated in FIG. 2.

When the images of the library 1 have been classified, they may be arranged in accordance with the region character strings associated with them. Those images whose region character strings match most closely may be arranged, at least notionally, adjacent each other. For example, the images may be reordered in accordance with the associated region character strings so that images with similar content are adjacent each other. Thus, images which are visually similar to each other are arranged adjacent each other.

Figure 2:
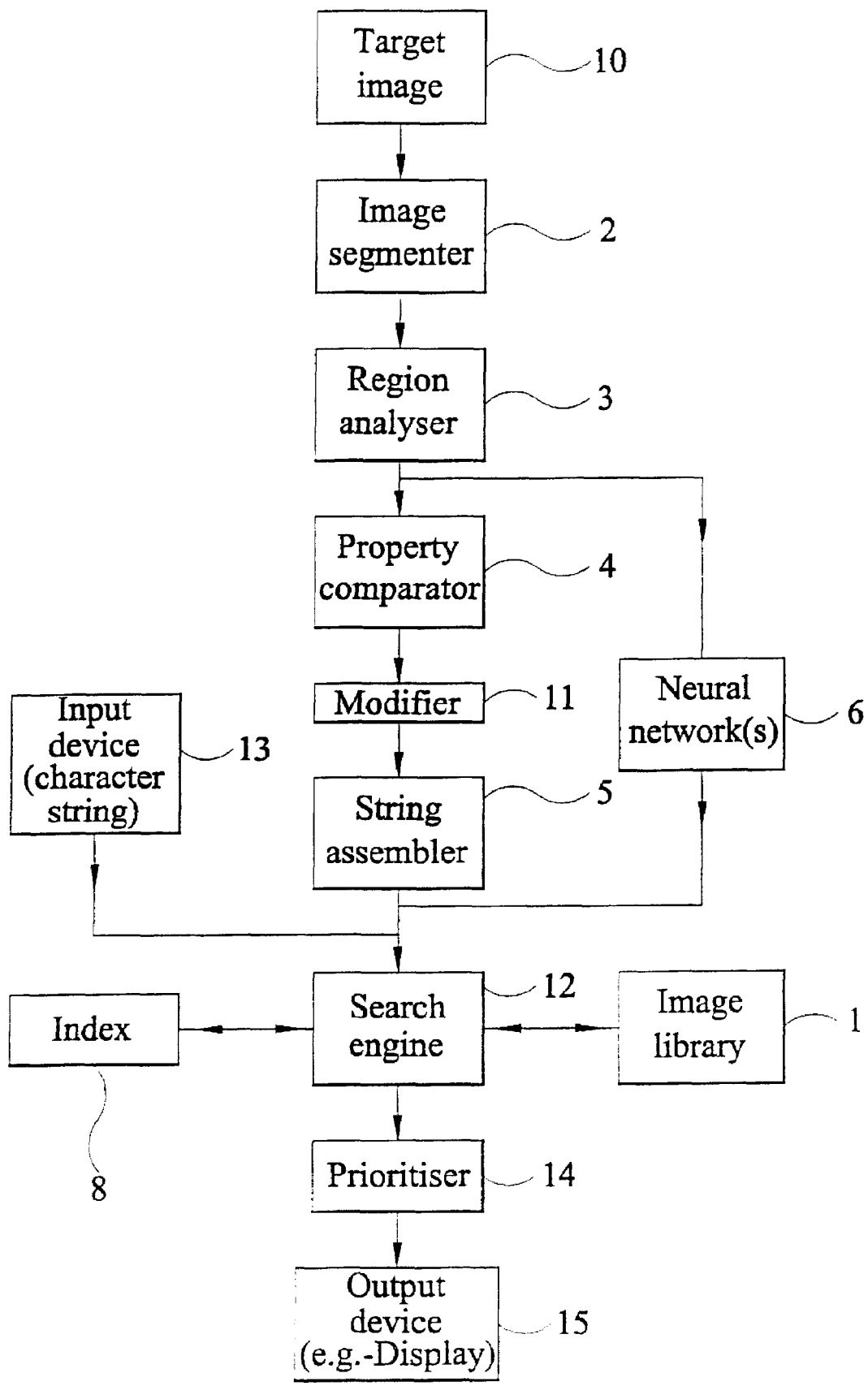
FIG. 2 is a block schematic diagram of a system for retrieving images constituting a second embodiment of the invention.

The image retrieval technique illustrated in FIG. 2 makes use of several of the components shown in FIG. 1 and referred to by the same reference numerals. Thus, when it is desired to find images having a similar content to a target image 10, the target image is supplied to the image segmenter 2 which segments the image as hereinbefore described. The region analyser 3, the property comparator 4, the string assembler 5 and the neural network or networks 6 operate on the segmented target image as described hereinbefore so that each of the coherent regions segmented by the segmenter 2 is allocated a character string representing its visual content. The character string may be that allocated by the property comparator 4 and the string assembler 5, a semantic region-word generated by one of the neural networks 6 or both of these.

Alternatively or additionally, character strings may be entered by means of an input device 13 for forming the basis of an alternative or additional search. For example, the region-words "sun", "sky", and "sand" may be entered manually in order to search for and retrieve images of beach scenes.

The property comparator 4 supplies the characters for forming the region character strings to the string assembler 5 via a modifier 11. The modifier 11 passes the characters allocated by the property comparator 4 to the string assembler 5 and, in addition, selectively modifies some of the characters in accordance with predetermined rules so as to extend the field of search for similar images. For example, some properties of a region may be varied in order to extend the field of search to images having, for example, different scales, where it is desired to retrieve images having a similar content but in which the features of the image are larger or smaller than in the target image, a different colour, etc. Thus, the modifier 11 may generate additional character strings in which the character representing, for example, the region size is changed to represent the next bigger and/or next smaller band of possible sizes. Similar variations or "smudging" may be desirable with other region properties, such as colour as mentioned above. The string assembler 5 assembles the unmodified characters into a region character string and also assembles the modified characters into further region character strings for use in searching and retrieval.

All of the region character strings are supplied to a search engine 12 which searches the index 8 for matches with the region character strings formed from the target image 10. The searching strategy comprises or is based on conventional text retrieval techniques and the search engine 12 determines the identities of images in the image library 1 where at least one of the target image region character strings matches a region character string of the image in the library. The image and details of the matches which have been found are supplied to a prioritiser 14 which orders the images, if more than one has been found, from the image library in accordance with the likelihood of a match with the target image. For example, the prioritiser 14 may ascribe to the retrieved image a priority based on the number of target image region character strings which match with region character strings of the retrieved image. The retrieved images may then be supplied in order of priority to an output device 15, which may, for example, comprise a display or a printer.

Prioritisation performed by the prioritiser 14 may be based on other factors or combinations of factors. For example, higher priority may be given to retrieved images where regions whose characters strings match with target image region character strings are located in the same relative positions in the target image and in the retrieved image.

Figure 3:
FIG. 3 shows a photograph of an image to be classified.

In order to illustrate the operation of the above-described image classification and retrieval systems, a simplified specific example will be described. FIG. 3 shows an image in the form of a photograph of red and green grapes for classification in accordance with the system illustrated in FIG. 1. The original colour image has been converted to a monochrome image to meet the requirements of patent drawings.

Figure 4:
FIG. 4 illustrates regions resulting from segmentation of the image of FIG. 3.

The image in computer-readable form is supplied from the image library 1 to the image segmenter 2, which segments the image into coherent regions. The boundaries of the coherent regions are illustrated in FIG. 4 in black. In FIG. 4, the segmented regions are filled in the average grey level of the corresponding regions in FIG. 3; for colour images, the average or mean colour of the region is used for filling in. In the present highly simplified example, the region properties which will be considered are brightness, size and texture. However, in practice, further properties of the coherent regions would be analysed and classified as mentioned hereinbefore. The numeric ranges of these three properties are as follows:

| Property | Numeric range |
|---|---|
| Brightness | 0 to 255 |
| Size (pixels) | 1 to 1000000 |
| Texture (smoothness) | 0 to 100 |

The number of bands for each of these properties and the character mapping in the present case is as follows:

| Property | Number of bands | Character Mapping |
|---|---|---|
| Brightness | 5 | [0 to 50] = "a" |
| | | [51 to 101] = "b" |
| | | [102 to 152] = "c" |
| | | [153 to 203] = "d" |
| | | [204 to 255] = "e" |
| Size | 3 | [1 to 10000] = "a" |
| | | [10001 to 100000] = "b" |
| | | [100001 to 1000000] = "c" |
| Texture | 10 | [0 to 10] = "a" |
| | | [11 to 20] = "b" |
| | | ... |
| | | [91 to 100] = "j" |

In this example, the brightness and texture mappings are substantially linear whereas the size mapping is substantially logarithmic. However, other mappings may be used.

Examples of coherent regions in FIG. 4 are indicated by A and B. The region analyser 3 analyses the properties of the region B and provides values of 200 for the brightness, 50000 pixels for the size and a texture value of 5. The property comparator 4 compares these values with the bands in the above table and ascribes the characters "d", "b" and "a" to the brightness, size and texture, respectively. The string assembler 5 assembles these to form a region character string for the region B of "dba". In this case, it is assumed that no neural network is trained to recognise grapes. The text indexer 7 creates an index entry in the index 8 for the region B based on the region character string, for example using the XML—like format described hereinbefore. This is then repeated for all of the other coherent regions illustrated in FIG. 4.

Figure 5:
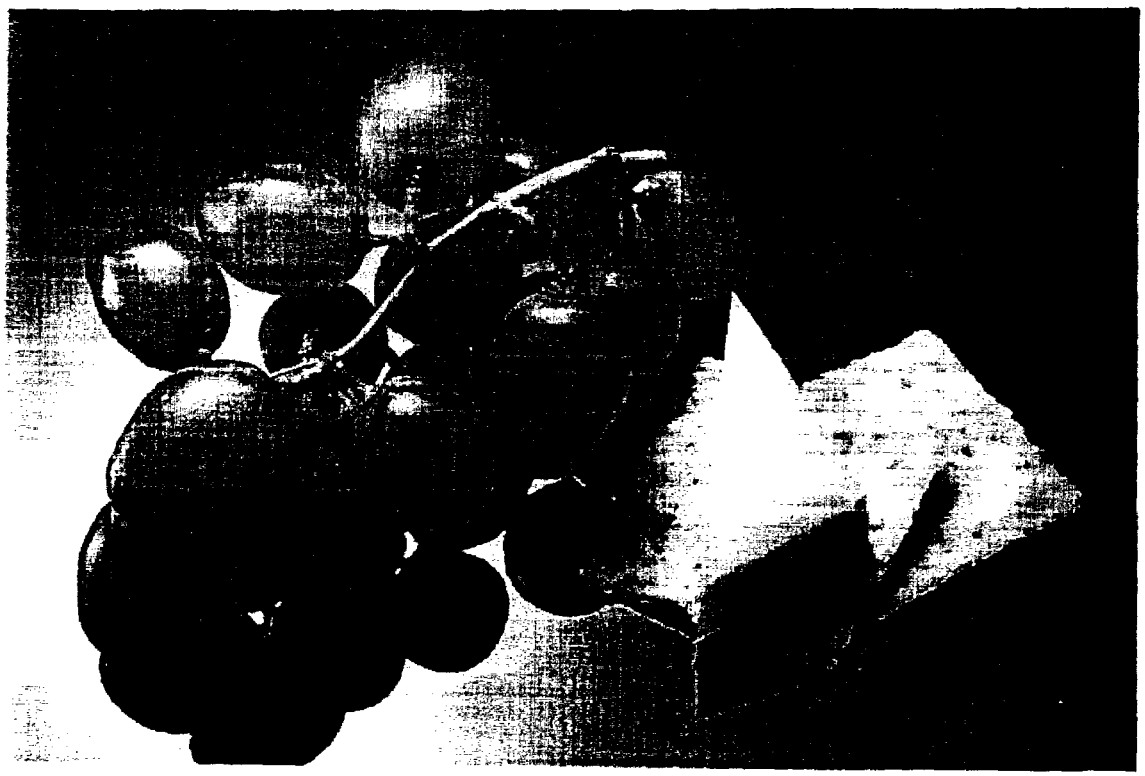
FIG. 5 shows a photograph of another image to be classified.
Figure 6:
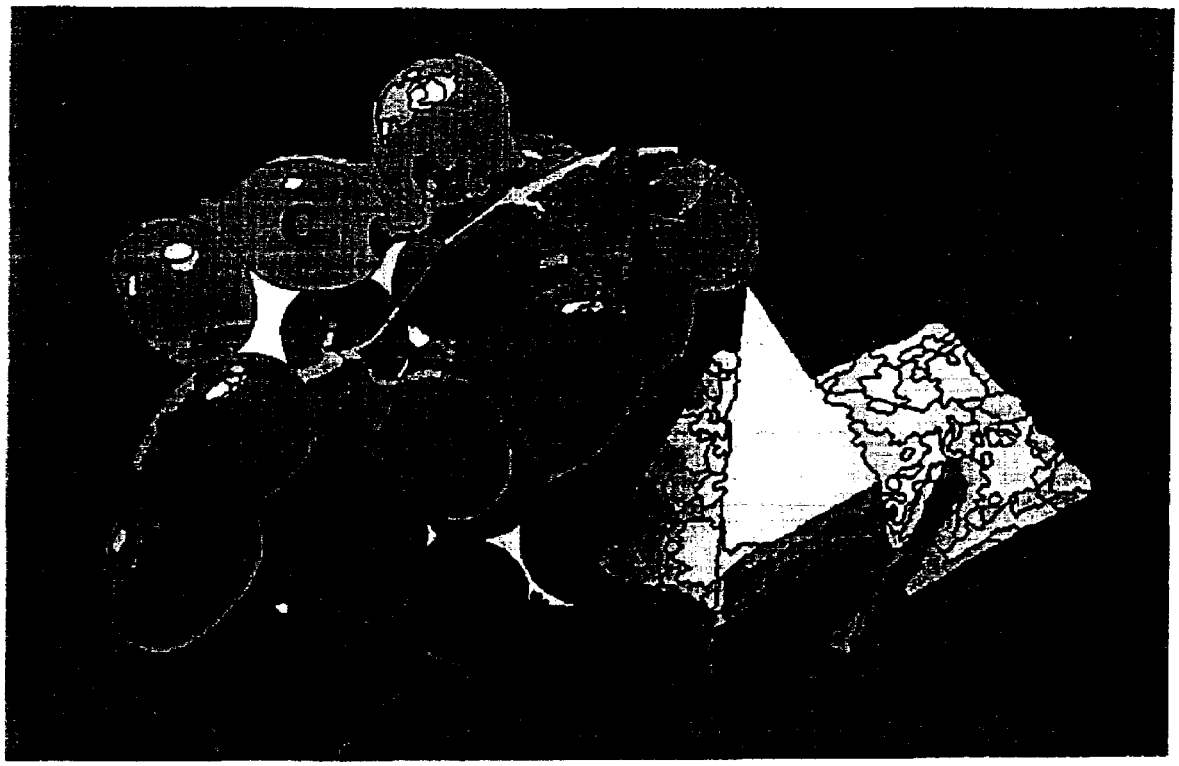
FIG. 6 illustrates regions resulting from segmentation of the image of FIG. 5.

In this specific example, image retrieval is then performed on the basis of the target image shown in FIG. 5, which is a photograph of green grapes, cheese and biscuits. This image is supplied to the image segmenter 2 of the retrieval system shown in FIG. 2 which segments the target image as illustrated in FIG. 6. Again in FIG. 6, the regions are filled in with the average grey level of the corresponding regions of the target image in FIG. 5. The region analyser 3 analyses the properties of each region, for example starting with the region C in FIG. 6, and determines that this region has a brightness of 180, a size of 30000 and a texture of 10. The property comparator 4 compares these values with the bands in the above table and determines that the brightness corresponds to the character "d", the size corresponds to the character "b" and the texture corresponds to the character "a". These characters are supplied via the modifier 11 to the string assembler 5 which creates the region character string "dba" and supplies this to the search engine 12.

The search engine 12 may respond to each region character string as it is created or may wait until all of the region character strings for the target image 5 have been created. In either case, the index 8 is then searched for matches and, in this case, finds a match between a region character string for the image of FIG. 3 and the region character string for the image of FIG. 5. The image of FIG. 5 is retrieved from the image library and is supplied to the output device 15. If matches with other images are found, the resulting set of images may be prioritised or ranked by the prioritiser 14, for example according to how many other matching region character strings were found or according to the relative location of matching regions (or any other suitable criteria). The prioritiser 14 orders the supply of images from the library 1 to the output device 15 so as to try to ensure that the most similar images appear at the top of a list of retrieved images or are displayed in order of ranking or priority by the output device 15.

Figure 7:
FIG. 7 shows a photograph of an image for entry to the retrieval system shown in FIG. 2.
Figure 8:
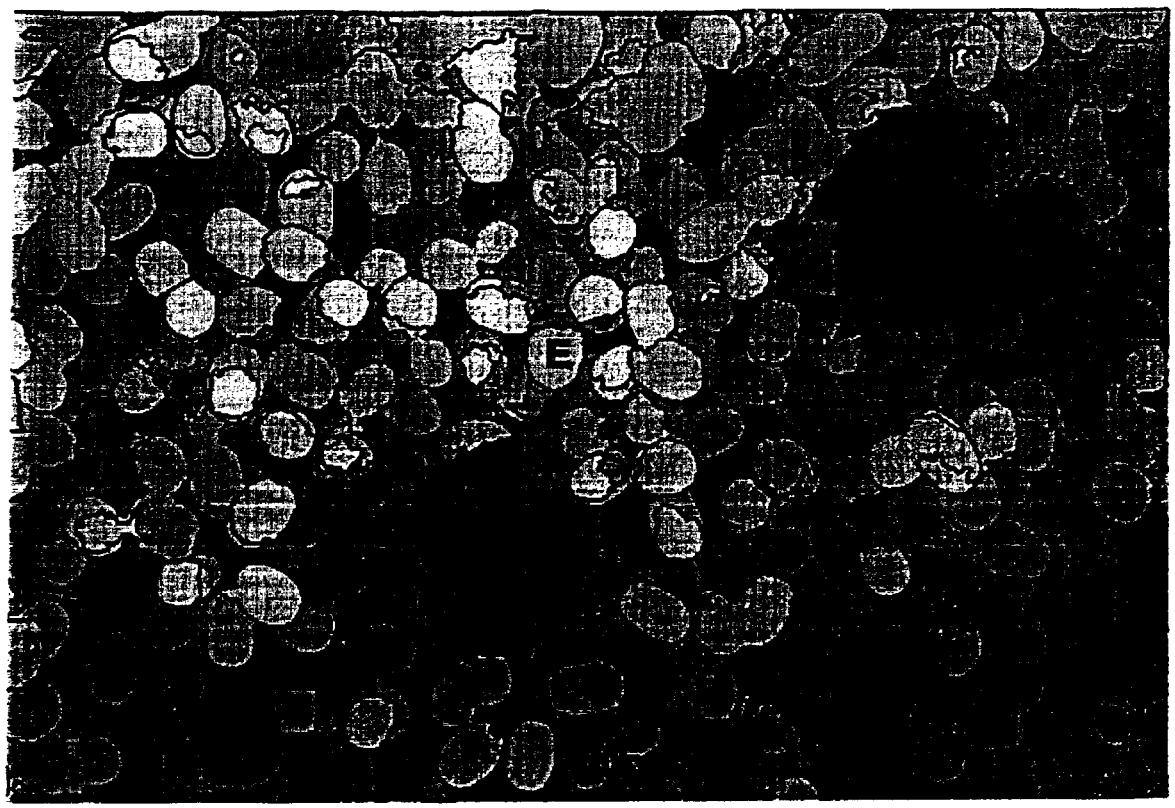
FIG. 8 illustrates regions resulting from segmentation of the image of FIG. 7.

FIG. 7 illustrates another target image comprising a photograph of green grapes. When this target image is supplied to the system shown in FIG. 2, it is segmented as illustrated in FIG. 8 and the region analyser 3 determines that the coherent region E has a brightness of 200, a size of 9000 and a texture of 3. The property comparator 4 determines that the corresponding characters are "d", "a" and "a". The string assembler 5 forms this into a region character string "daa" and supplies this to the search engine 12. A search based on this region character string would not, therefore, find a match with the region B of the image shown in FIG. 3. However, the modifier 11 is arranged, in this example, to vary the character representing the size in order to attempt to locate matches with similar images of different scales. In particular, in the present case, the modifier 11 also supplies the character b representing the size to the string assembler 5 which additionally supplies the region character string "dba" to the search engine 12. The resulting search thus retrieves the image of FIG. 3 as a match to the target image of FIG. 7.

Figure 9:
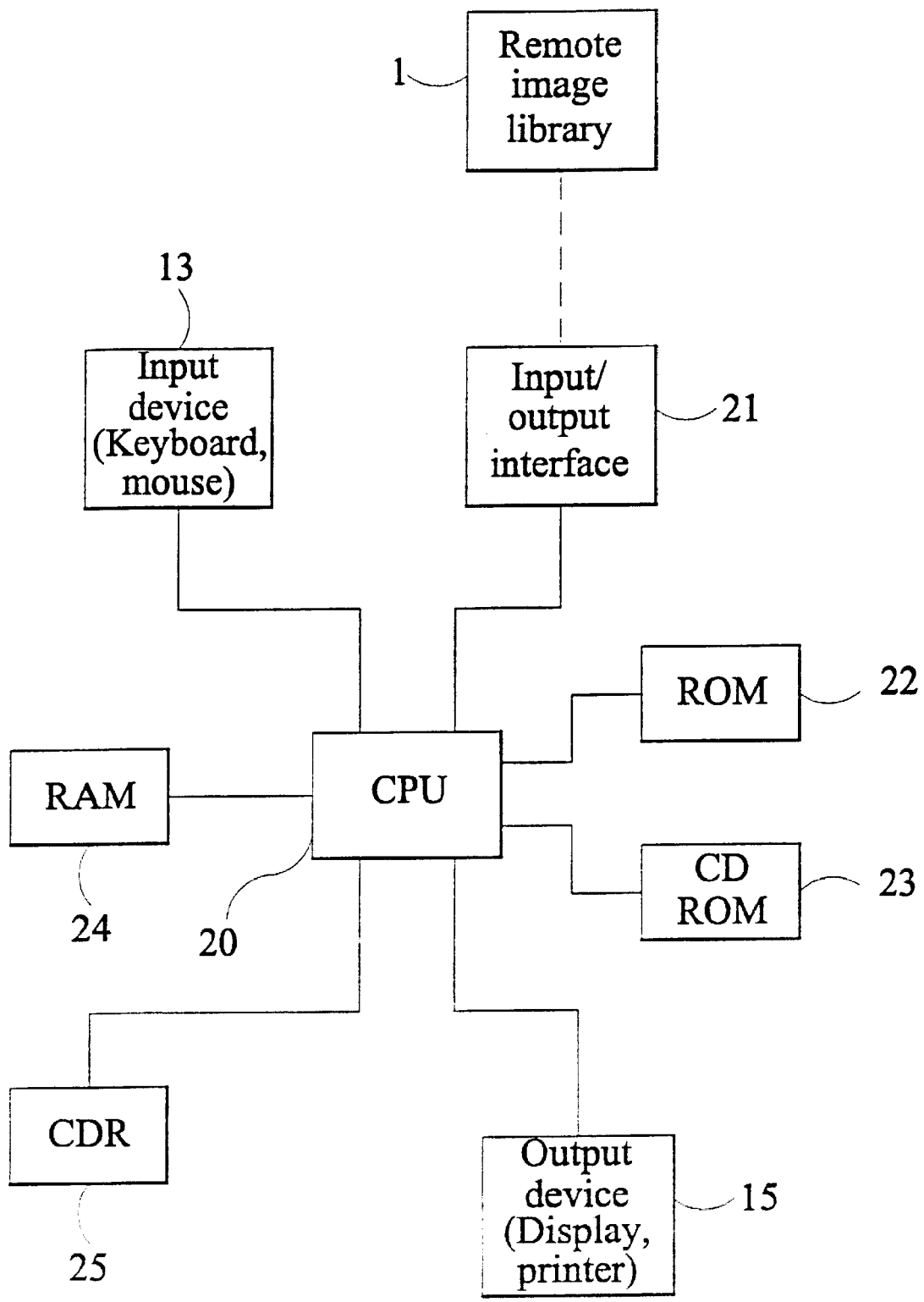
FIG. 9 is a block schematic diagram of an apparatus for embodying the systems of FIGS. 1 and 2.

FIG. 9 illustrates a computer-based apparatus for embodying the image classification and retrieval systems of FIGS. 1 and 2. The apparatus comprises a central processing unit (CPU) connected to the input device 13 and the output device 15. In the case where the image library 1 is remote, for instance accessible via the internet, the CPU 20 receives the image data via an input/output interface 21 of any suitable type.

A program for controlling the operation of the CPU to perform the image classification and retrieval as described hereinbefore is contained in a suitable medium, such as a read only memory ROM 22 and/or a CD-ROM 23. Where the image library is provided locally, it may likewise be contained in a CD-ROM. The CPU 20 is provided with "working memory" illustrated as a random access memory RAM 24.

The index formed by the image classification system may be stored in any suitable form. For example, this may be stored in the RAM 24 provided this is of the non-volatile type. As an alternative or additionally, the index may be supplied to a CD writer (CDR) 25 so that the index is stored in a CD-ROM.

During image retrieval, the target image may be supplied via the interface 21. Other region character strings may be entered by means of the input device 13. In the case of a remote image library 1, images may be retrieved via the input/output interface 21. In the case of a locally stored image library, the images may be retrieved from the CD-ROM 23. Retrieved images may then be supplied to the output device, for example for display on a display screen or for printing to provide a hardcopy.

What is claimed:

1. A computerized method of classifying an image, comprising using a computer to perform the following steps:
   quantifying a visual property of a region of the image on a numeric scale for the property;
   comparing the quantified property with a plurality of bands of the numeric scale for the property, each band being associated with a computer-readable character;
   determining the character associated with the band in which the quantified property falls; and
   classifying the image region using the determined character.

2. A method as claimed in claim 1, comprising performing the quantifying, comparing and determining steps for each of a plurality of visual properties of the region, arranging the plurality of determined characters in a predetermined order to form a region character string, and performing the classifying step based on the formed region character string.

3. A method as claimed in claim 2, comprising supplying at least one of the quantified properties to at least one neural network which is trained to recognise at least one substance and forming, in response to recognition by the neural network, another region character string.

4. A method as claimed in claim 3, in which the other region character string is descriptive of the at least one substance.

5. A method as claimed in claim 3, in which the other region character string is a semantic word.

6. A method as claimed in claim 1, comprising segmenting the image into a plurality of regions, and performing the quantifying, comparing, determining and classifying steps for each of the plurality of regions.

7. A method as claimed in claim 6, in which the segmenting step comprises segmenting the image into a plurality of coherent regions.

8. A method as claimed in claim 1, in which the visual property is area.

9. A method as claimed in claim 8, in which the numeric scale for area is logarithmic.

10. A method as claimed in claim 1, in which the visual property is a colour property.

11. A method as claimed in claim 10, in which the numeric scale for the colour property is linear.

12. A method as claimed in claim 1, in which the visual property is brightness.

13. A method as claimed in claim 12, in which the numeric scale for brightness is linear.

14. A method as claimed in claim 1, in which the visual property is shape.

15. A method as claimed in claim 1, in which the visual property is texture.

16. A method as claimed in claim 2, in which each region character string includes two-dimensional coordinates representing the position of the corresponding region in the image.

17. An apparatus for classifying an image, comprising:
   computer means for quantifying a visual property of a region of the image on a numeric scale for the property;
   computer means for comparing the quantified property with a plurality of bands of the numeric scale for the property, each band being associated with a computer-readable character;
   computer means for determining the character associated with the band in which the quantified property falls;
   and computer means for classifying the image region using the determined character.

18. A program stored on a computer-readable medium which, when executed by a computer, performs a method of classifying an image, the method comprising:
   quantifying a visual property of a region of the image on a numeric scale for the property;
   comparing the quantified property with a plurality of bands of the numeric scale for the property, each band being associated with a computer-readable character;
   determining the character associated with the band in which the quantified property falls; and
   classifying the image region using the determined character.

* * * * *